United States Patent [19]

Kunze

[11] Patent Number: 5,019,928
[45] Date of Patent: May 28, 1991

[54] MAGNETIC-TAPE-CASSETTE APPARATUS COMPRISING A DECK AND A LOAD AND EJECT MECHANISM

[75] Inventor: Norbert Kunze, Ehringshausen, Fed. Rep. of Germany

[73] Assignee: U.S. Philips Corporation, New York, N.Y.

[21] Appl. No.: 360,643

[22] Filed: Jun. 2, 1989

[30] Foreign Application Priority Data

Jun. 4, 1988 [DE] Fed. Rep. of Germany ....... 3819096

[51] Int. Cl.$^5$ ............................................. G11B 5/008
[52] U.S. Cl. .................................................. 360/96.5
[58] Field of Search ...................... 360/96.5, 96.6, 96.1

[56] References Cited

U.S. PATENT DOCUMENTS

| 3,524,651 | 8/1970 | Ketzer . | |
|---|---|---|---|
| 4,208,023 | 6/1980 | Demol | 360/96.5 |
| 4,348,704 | 9/1982 | Takagi et al. | 360/96.5 |
| 4,374,401 | 2/1983 | Takai | 360/96.5 |
| 4,441,129 | 4/1984 | Nakao | 360/96.5 |
| 4,467,378 | 8/1984 | Schatteman | 360/96.5 |
| 4,623,945 | 11/1986 | Deutsch et al. | 360/96.5 |

FOREIGN PATENT DOCUMENTS 2027973  2/1980  United Kingdom .

Primary Examiner—A. J. Heinz
Assistant Examiner—Jefferson Evans

[57] ABSTRACT

A magnetic-tape-cassette apparatus is disclosed which includes a deck for playing magnetic-tape cassettes, which deck can be actuated via two actuating rods (14a, 15a). The deck includes a loading mechanism to pull in and lower a magnetic-tape cassette (2) into a play position and to lift the cassette into an unloading position and eject it by means of a third actuating rod (13a), a lift lever (3) and an actuating lever (21), a follower (26) of the third actuating rod (13a), which follower cooperates with a pivoting guide (25) of the actuating lever (21), pivoting the actuating lever (21) into the unloading position with the aid of an eject spring (27) when the guide (25) allows this pivotal movement to be performed, and a follower pin (31) of the lift lever (3) cooperating with a lift guide (32) of the third actuating rod (13a) to lower or to lift the lift lever (3) under control of the lift guide (32) during actuation of the third actuating rod (13a). One of the expanding end limbs (28) of the eject spring (27) urges the actuating lever (21) in the eject direction and the other limb (29) urges the lift lever (3) in the lifting direction.

3 Claims, 2 Drawing Sheets

MAGNETIC-TAPE-CASSETTE APPARATUS COMPRISING A DECK AND A LOAD AND EJECT MECHANISM

BACKGROUND OF THE INVENTION

1. Field of the Invention

The invention relates to a magnetic-tape-cassette comprising a deck for playing magnetic-tape cassettes, which deck is constructed to be actuated via two actuating rods and comprises a loading mechanism to insert and lower the magnetic-tape cassette into a play position and to lift said cassette into an unloading position and eject it by means of a third actuating rod, a lift lever and an actuating lever, a follower of the third actuating rod, which follower cooperates with a pivoting guide of the actuating lever, pivoting the actuating lever into the unloading position with the aid of an eject spring when the guide allows said pivotal movement to be performed, and a follower pin of the lift lever cooperating with a lift guide of the third actuating rod to lower or to lift the lift lever under control of the lift guide during actuation of the third actuating rod.

2. Description of the Related Art

A magnetic-tape apparatus of the type referred to above is known from U.S. Pat. No. 4.623.945. The deck can be controlled by means of three actuating rods, two for fast-wind functions and a third one for an eject function. The actuating rods are operated manually. There is provided a loading mechanism comprising a cassette holder which can be lowered into a play position and which can be lifted into a loading/unloading position. Lowering and lifting is achieved by means of a lift guide on the third actuating rod. The lifting and lowering operations are controlled via a lift lever which cooperates with the lift guide of the third actuating rod by means of a follower. Moreover, there is provided an actuating lever having a pivoting guide which cooperates with a follower pin of the third actuating rod. When a magnetic-tape cassette is inserted into the cassette holder, which is in its loading/unloading position, a cassette coupler on the actuating lever engages reel-hub bore in the magnetic-tape cassette. The magnetic-tape cassette then moves the cassette coupler in the direction of insertion and pivots the actuating lever clockwise into a position which it occupies in the play mode. During this pivotal movement the follower of the third actuating rod becomes disengaged from the pivoting guide of the actuating lever and an eject spring urges the third actuating rod forwards. This forward movement allows the follower pin of the lift lever to move obliquely downwards in the lift guide, causing the lift lever to be pivoted about its pivotal axis and the cassette holder to be lowered into the play position by the front end of the lift lever.

The outward movement of the third actuating rod is obtained by means of an over-centre spring. When the third actuating rod is pushed inwards to lift the cassette holder the upward movement of the follower pin of the lift lever in the lift guide proceeds with comparative difficulty. This effect becomes even more pronounced as the lift guide is steeper.

SUMMARY OF THE INVENTION

It is an object of the invention to facilitate the movement of the loading mechanism of the magnetic-tape apparatus during ejection, while the travel of the third actuating rod is reduced.

According to the invention this object is achieved in that one of the expanding end limbs of the eject spring loads the actuating lever in the eject direction and the other end limb loads the lift lever in the lifting direction.

Since the eject spring assists in the lifting or upward movement of the lift lever and in the eject movement of the actuating lever the follower pin can move upwards more easily in the lift guide. This easier upward movement enables the lift guide to be made steeper and hence the travel of the third actuating rod to be shortened.

In a further embodiment of the invention the eject spring is a helical spring arranged on a pivotal spindle of the lift lever. Such a helical spring with a plurality of turns acts on the actuating lever and on the lift lever with a pressure which remains substantially constant within the relevant range of movement.

In a further embodiment of the invention coupling arms of the two actuating rods engage in a recess in the third actuating rod, in such a way that during an outward movement of the relevant one of said two actuating rods, if it is not yet in its outer position, each of the coupling arms moves said third actuating rod in the outward direction.

BRIEF DESCRIPTION OF THE DRAWINGS

The invention will now be described in more detail, by way of example, with reference to the accompanying drawings. In the drawings.

DETAILED DESCRIPTION OF THE PREFERRED EMBODIMENT

Figure 1:
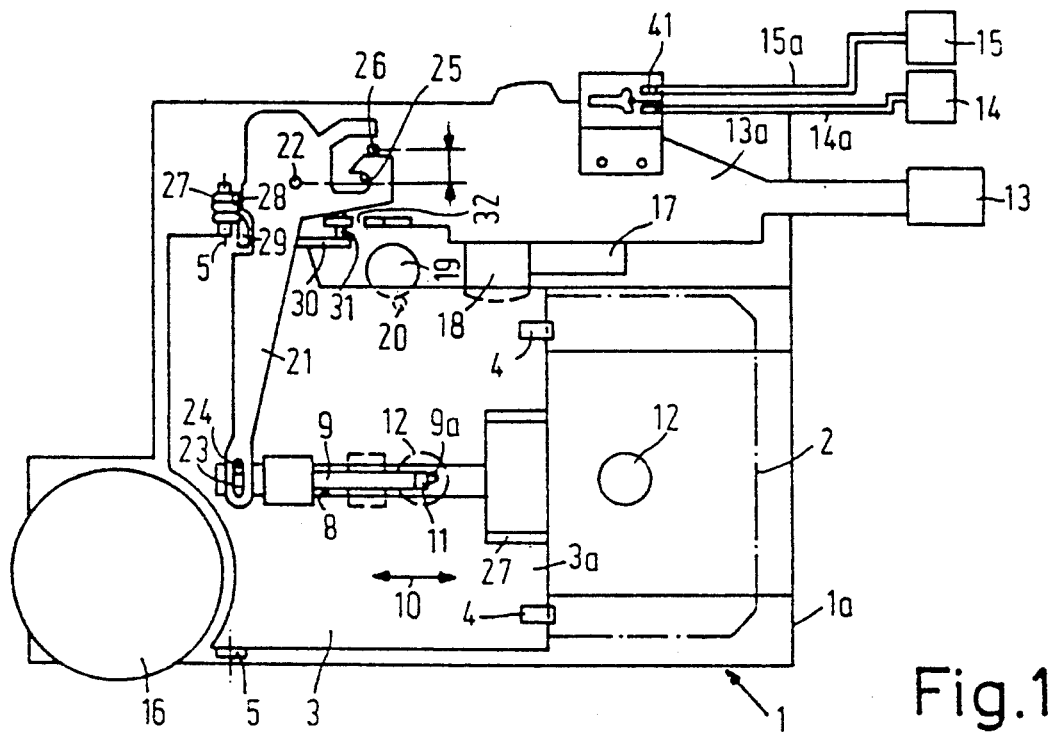
FIG. 1 shows the deck of a magnetic-tape-cassette apparatus comprising a cassette holder, a lift lever, an actuating lever and actuating rods.

The magnetic-tape-cassette apparatus 1, which is shown in simplified form in FIG. 1, comprises a cassette holder 1a, containing a Compact Cassette 2. The cassette holder 1a can be lowered in a direction perpendicular to the plane of the drawing by means of a lift lever 3, whose front end 3a engages coupling projections4 of the cassette holder 1a. The lift lever 3 is pivotable about a spindle 5. The lift lever 3 has a slotted guide 8 in which a strip-shaped cassette coupler 9 is movable in the directions indicated by a double arrow 10. At its front end 9a the cassette coupler 9 has a nose 11 which has engaged a reel-hub bore 12 of the magnetic-tape cassette 2. An actuating button 13 with an actuating rod 13a and two further actuating rods 14a, 15a with actuating knobs 14, 15 are provided for the tape-deck functions.

A head-mounting plate 17 carries a magnetic head 18 and a pressure roller 19. The pressure roller 19 cooperates with the capstan 20.

There is also provided an actuating lever 21 which is pivotable about a spindle 22. A slot 23 in the free end portion of the actuating lever 21 is engaged by a pin 24 of the cassette coupler 9. The nose 11 of the cassette coupler 9 then engages one of the reel-hub bores 12 of the cassette. In this position of the actuating lever the cassette holder 1a has been lowered into its play position.

The actuating lever 21 comprises a pivoting guide 25, which cooperates with a follower 26 of the actuating rod 13a. A helical spring 27 having end limbs 28, 29 is arranged on the spindle 5. One end limb 28 acts against the actuating lever 21 to pivot this lever anti-clockwise into the eject position. The other end limb 29 engages underneath the lift lever 3.

The left lever 3 comprises a projection 30 carrying a follower pin 31. This follower pin 31 engages in a vertically oriented lift guide 32 mounted on the actuating rod 13a. By means of this guide 32 the free end 3a of the lift lever 3 can be pivoted upwards and downwards about the spindle 5.

Figure 2:
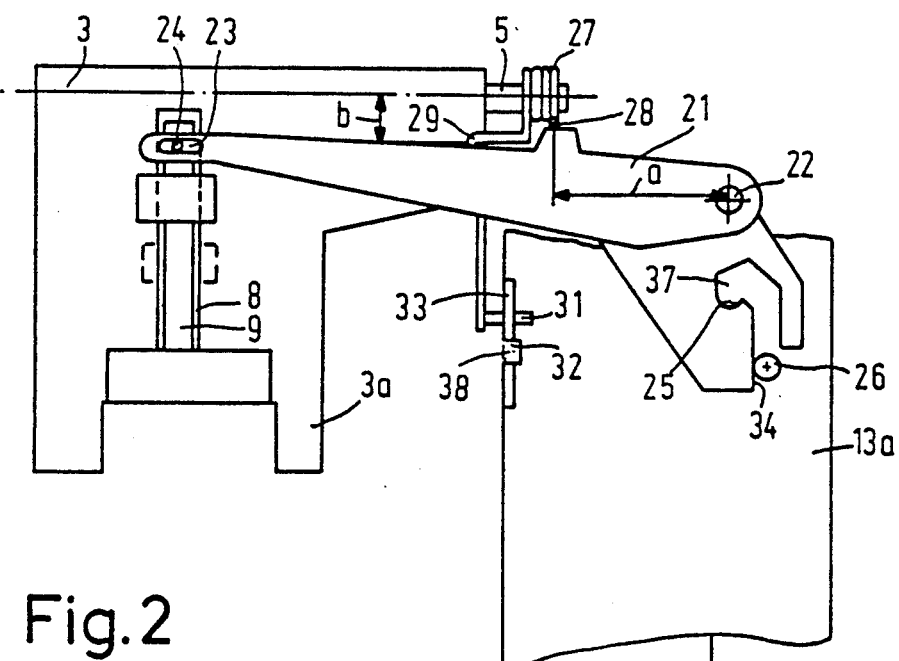
FIG. 2 shows a part of the apparatus to illustrate the cooperation between the lift lever, the actuating lever and the actuating rod in the play position.

FIG. 2 shows a part of the deck shown in FIG. 1 to an enlarged scale, to illustrate the cooperation between the actuating rod 13a, the actuating lever 21 and the lift lever 3. The front end 3a of the lift lever 3 has been pivoted downwards, because the follower pin 31 has entered the guide in the plane of the drawing and has engaged underneath a guide wall 33. The end limb 28 of the helical spring 27 presses against the actuating lever 21 at a distance from the spindle 22 marked a in FIG. 2. The other end limb 29 engages underneath the lift lever 3 at a distance b from the spindle 5. The follower 26 on the actuating rod 13a is situated on an inclined portion 34 of the guide 25 in the actuating lever 21.

Figure 3:
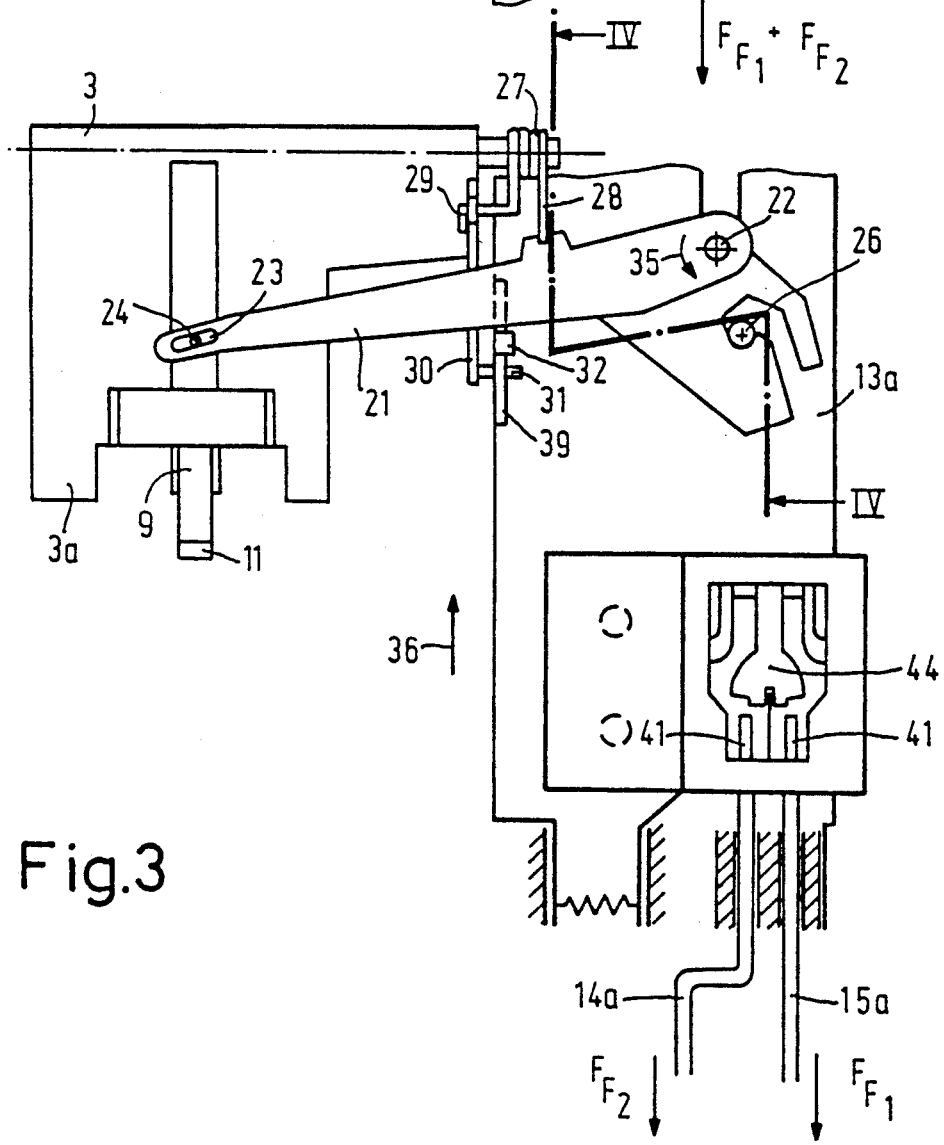
FIG. 3 shows the same part as in FIG. 2 in the loading/unloading position.

FIG. 3 shows a position of the loading mechanism in which the actuating lever 21 has been pivoted in the direction indicated by an arrow 35. By means of the slot 23 the pin 24 has been moved to bring the cassette coupler 9 into the unloading position. This is possible because the actuating rod 13a has been pushed inwards in the direction indicated by an arrow 36, enabling the follower 26 to engage a recess 37 in the guide 25. This engagement of the follower 26 in the recess 37 allows the actuating lever 21 to be pivoted in the direction indicated by the arrow 35. The pivotal movement is produced by the end limb 28 of the helical spring 27. At the same time that the actuating rod 13a moves inwards the follower pin 31 is moved upwards on an inclined surface 38 of the lift guide 32. In the situation illustrated in FIG. 3 said pin is situated on an upper portion 39 of the lift guide 32. The construction of the lift guide 31 is illustrated more clearly in FIG. 4.

The spring force exerted by the other end limb 29 of the helical spring 27 assists in the upward movement of the follower pin 31. During this upward movement the front end 3a of the lift lever 3 is pivoted upwards and the lift lever 3 has thus lifted the cassette holder 1a, which is visible in FIG. 1, into the unloading position.

FIG. 3 illustrates how the further actuating rods 14a and 15a assist in the upward movement of the cassette holder 1a and the pivotal movement of the actuating lever 21. The two further actuating rods are urged in the outward direction by means of the springs shown in FIG. 4. The further actuating rods 14a and 15a comprise coupling arms 41. These coupling arms 41 extend through an opening 42 in the actuating rods 13a and at this location they engage, for example, a switching element 43, mounted on the rod 13a in which element 43 a pivotable arm 44 is arranged to inhibit a simultaneous inward movement of the two further actuating rods 14a and 15a. The springs 40 exert forces $F_{F1}+F_{F2}$ on the actuating rod 13a to urge this rod in the eject direction. In FIG. 2 the forces are represented as acting concurrently. The two springs 40 thus ensure that the actuating rods 13a is always spring-loaded in the outward direction.

Figure 4:
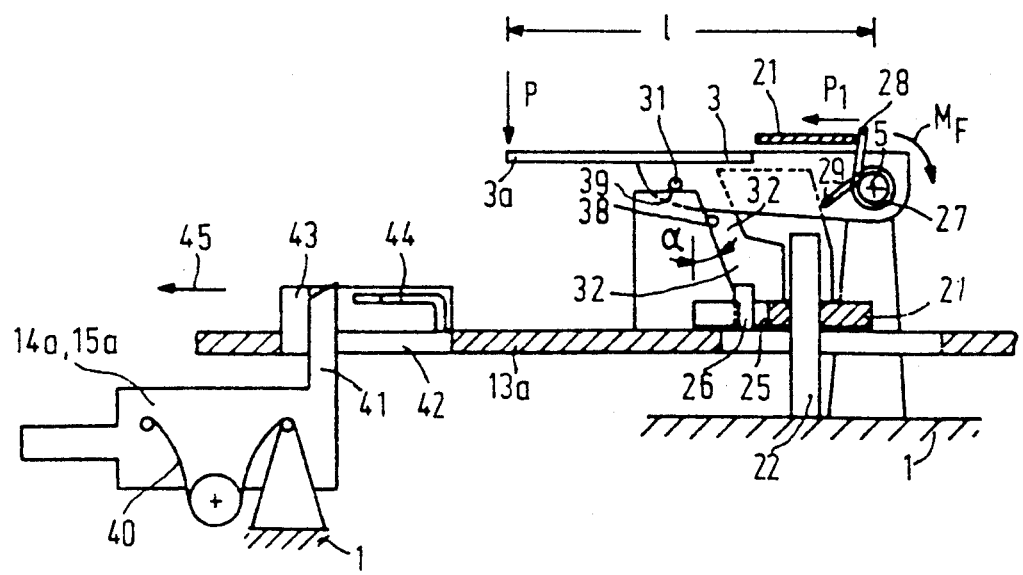
FIG. 4 is a side view of the part shown in FIG. 3.

FIG. 4 is a sectional view taken on the line IV—IV in FIG. 3, to illustrate the cooperation between the individual parts in the situation shown in FIG. 3. The Figure shows the spindle 22 about which the actuating lever 21 is pivotable. The follower 26, which is secured to the actuating rod 13a, engages the recess 37 in the pivoting guide 25. The follower pin 31 has moved onto the portion 39 of the lift guide 32 via the inclined surface 38. The front end 3a of the lift lever 3 has been pivoted upwards in the horizontal position and has thus lifted the cassette holder, not shown. The end limb 28 of the helical spring 27 has pivoted the actuating lever 21 in the direction indicated by the arrow 35 and the other end limb 29 has assisted in moving the follower pin 31 upwards on the inclined surface 38.

FIG. 4 also shows how the actuating arms 41 act against the switching element 43 and how the further actuating rods 14a, 15a load the actuating rod 13a in the eject direction 45.

The torque $M_F$ exerted by the helical spring 27 is larger than the product of the force P and the length l of the lever arm of the lift lever 3 between its spindle 5 and the point of engagement of the front end 3a of the lift lever on the cassette holder 1a. The force P is produced by the weight of the cassette and the holder. The force $P_1$ indicated in FIG. 1 is the ejection force to be exerted on the cassette by the actuating lever 21.

Since the spring 27 aids the lifting movement the angle of inclination $\angle$ of the inclined surface 38 of the lift guide 32 can be reduced which results in the outward travel of the actuating rod 13a being shortened.

I claim:

1. A magnetic-tape-cassette apparatus (1) comprising a deck for playing magnetic-tape cassettes, which deck is constructed to be actuated via first and second actuating rods (14a–15a) and comprises a loading mechanism for inserting and lowering a magnetic-tape cassette (2) into a play position and for lifting said cassette into an unloading position, said cassette being ejected from said deck by means of a third actuating rod (13a), a lift lever (3) and an actuating lever (21), a follower (26) of the third actuating rod (13a), which follower cooperates with a pivoting guide (25) of the actuating lever (21), pivoting the actuating lever (21) into said unloading position with the aid of an eject spring (27), having first and second ends, when the guide (25) allows said pivotal movement to be performed, and a follower pin (31) of the lift lever (3) cooperating with a lift guide (32) of the third actuating rod (13a) to lower or to lift the lift lever (3) under control of the lift guide (32) during actuation of the third actuating rod (13a), characterized in that said first end of the eject spring (27) biases the actuating lever (21) to eject said cassette and said second end of the eject spring biases the lift lever (3) toward said unloading position.

2. A magnetic-tape-cassette apparatus as claimed in claim 1, characterized in that the eject spring (27) is a helical spring arranged on a pivotal spindle (5) of the lift lever (3).

3. A magnetic-tape-cassette apparatus as claimed in claim 1, in which said first and second actuating rods (14a, 15a) are arranged to be movable parallel to the third actuating rod (13a) and are biased in an outward direction by means of springs (40), characterized in that coupling arms (41) of said first and second actuating rods (14a, 15a) engage in a recess (42) in the third actuating rod (13a) in such a way that during an outward movement of the relevant one of said first and second actuating rods (14a, 15a), if it is not yet in its outer position each of the coupling arms (41) moves said third actuating rod (13a) in the outward direction.

* * * * *